United States Patent [19]

Young

[11] Patent Number: 5,683,292

[45] Date of Patent: Nov. 4, 1997

[54] ABRASIVE PLATE

[76] Inventor: Wayne Young, Allview Ave., Brewster, N.Y. 10509

[21] Appl. No.: 690,723

[22] Filed: Jul. 31, 1996

[51] Int. Cl.$^6$ .................................................. B24D 71/00
[52] U.S. Cl. ........................ 451/552; 451/553; 451/356; 29/76.4; 76/101.1
[58] Field of Search ..................... 451/552, 553, 451/356; 29/76.1, 76.3, 76.4, 81.11; 76/101.1

[56] References Cited

U.S. PATENT DOCUMENTS

| | | |
|---|---|---|
| 38,101 | 4/1863 | Earle . |
| 190,115 | 7/1877 | Mason . |
| 270,384 | 1/1883 | Call . |
| 571,358 | 11/1896 | Gilmore ................................. 29/76.4 |
| 1,443,259 | 1/1923 | Graves . |
| 2,403,805 | 7/1946 | Kulla . |
| 2,820,281 | 1/1958 | Amsen . |
| 3,389,447 | 6/1968 | Theobald et al. . |
| 3,509,611 | 5/1970 | Kifer . |
| 3,522,680 | 8/1970 | Sarofern . |
| 3,528,152 | 9/1970 | Funakubo et al. . |
| 3,545,308 | 12/1970 | Stutzke . |
| 3,583,107 | 6/1971 | Benis et al. . |
| 4,028,781 | 6/1977 | Konrad . |
| 4,423,571 | 1/1984 | Selander et al. .................. 451/356 |
| 4,989,304 | 2/1991 | Sonefors . |
| 5,056,203 | 10/1991 | Miller ............................... 451/356 |
| 5,142,829 | 9/1992 | Germain . |

*Primary Examiner*—Eileen P. Morgan
*Attorney, Agent, or Firm*—Dilworth & Barrese

[57] ABSTRACT

An abrasive plate for use with a power sanding device having an abrasive surface for performing abrading applications. The plate includes at least two rows of protrusions. The protrusions in each row have an orientation substantially the same as the other protrusions in the respective row. The protrusions in each row have a bottom edge portion oriented at an angle of from about 45° to about 135° with respect to the bottom edge portions of the protrusions in each adjacent row. By providing an abrasive plate having protrusions with the above-noted orientations, the forces transmitted through the plate between a surface being treated and a power sander will be substantially balanced.

11 Claims, 5 Drawing Sheets

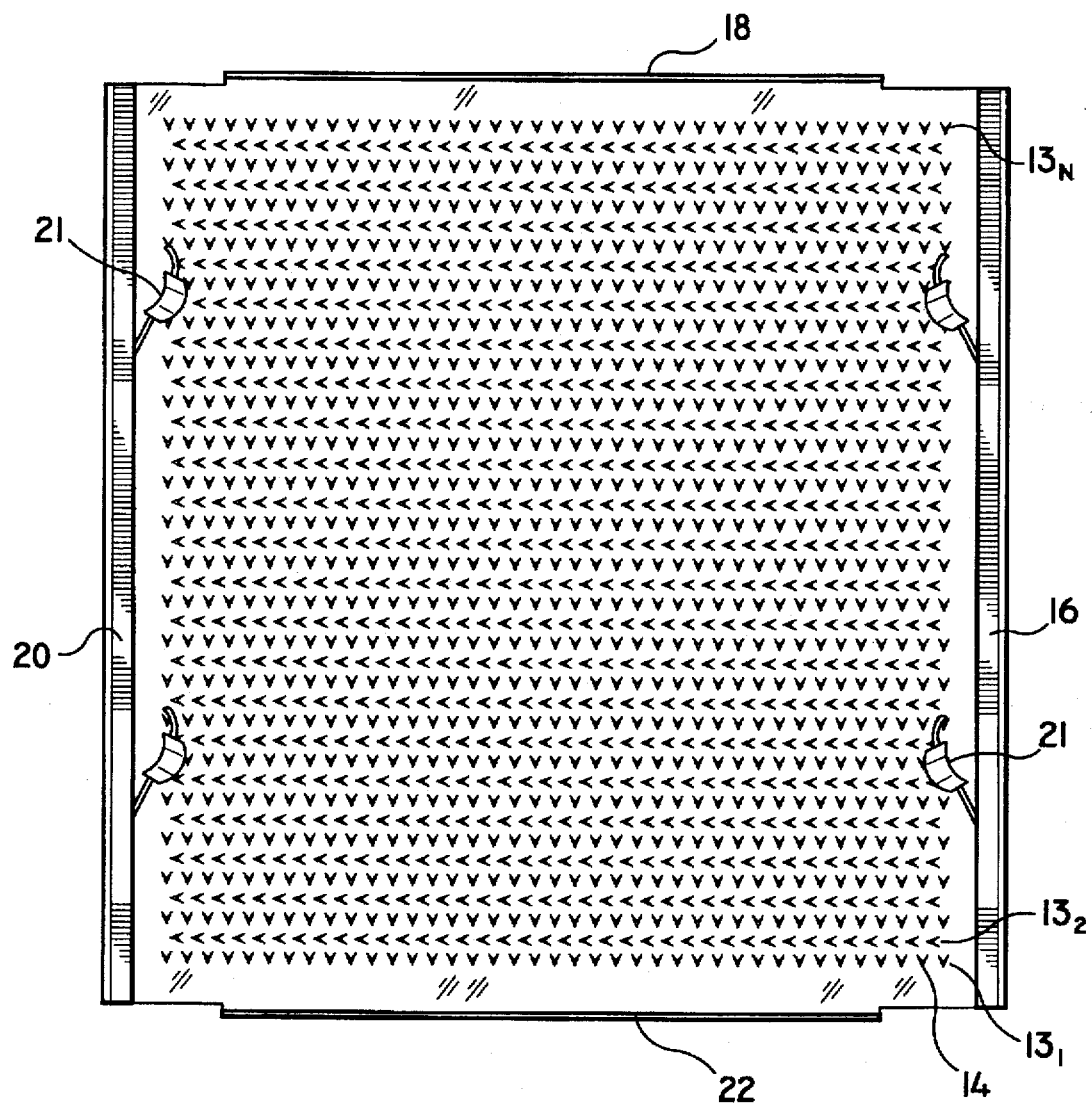
FIG. IB
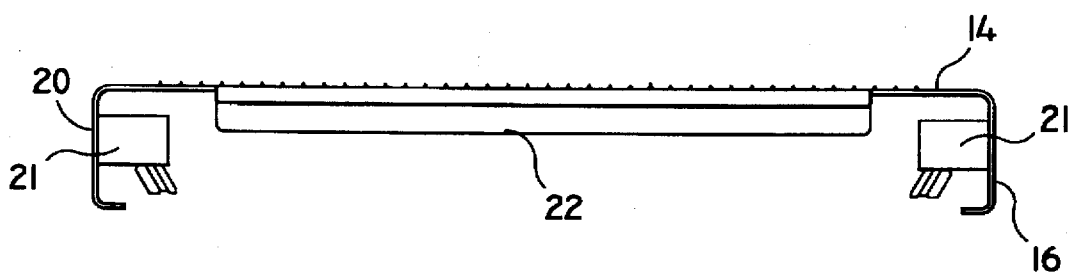
FIG. IC

ABRASIVE PLATE

BACKGROUND

1. Technical Field

The present disclosure relates generally to a unique surfacing tool. More particularly, the present disclosure relates to an abrasive metal plate adapted for use in a sanding machine, and to a method for producing an abrasive metal plate.

2. Background of Related Art

While sandpaper and similar materials are generally inexpensive, they become unserviceable through use in short periods of time. Sandpaper, for example, is easily ruptured as the abrasive particles attached to the base of the sandpaper become loosened, worn and clogged. The use of sandpaper with motor-powered tools exacerbates this problem in that due to the high speed of operation, most of the abrasive particles become quickly clogged with large amounts of wood flour or the particles become detached from the abrasive surface of the sandpaper.

To overcome this problem, abrasive metal sheets have been developed with integrally formed protrusions configured to perform abrading applications. For example, in U.S. Pat. No. 2,820,281, a metallic abrasive sheet is adapted to be used in the manner of sandpaper. The abrasive sheet is flexible so that it may be conformed to supporting blocks. Projections on an abrasive surface are formed by puncturing apertures in the sheet. In U.S. Pat. No. 3,545,308, a perforated abrasive metal sheet is provided for use with a reciprocating sander. The abrasive metal sheet is formed with generally rectangular shaped apertures which are punched in a metal sheet to form an abrasive surface. In U.S. Pat. No. 3,583,107, a flexible metal sheet is suggested for use with power sanders. Cutting edges for the sheet are formed by driving punches of various geometric shapes through the metal sheet.

While abrasive metal sheets have a service life greater than that of sandpaper, these sheets have been found to be more difficult than sandpaper to use with motor-powered sanders, e.g., random orbit sanders, vibratory sanders, etc. Because of the large number of protrusions in the metal sheet, the force transmitted from a surface being treated by the power sander through the plate is generally unbalanced. As such, the power sander has a tendency to pull in one direction as the sander is moved over the surface being treated, making it difficult for an operator to control the power sander and tiresome to operate the sander for sustained periods of time.

Accordingly, a need exists for an abrasive metal sheet adapted for use with motor-powered sanders that overcomes the above-noted disadvantages and is easy to make and use.

SUMMARY

In accordance with the present disclosure, an abrasive surfacing plate, preferably in the form of a perforated metal sheet, is provided. The abrasive plate includes a planar base member having a plurality of transversely aligned rows of protrusions extending from an abrasive face of the base member. Each of the protrusions has a bottom edge portion attached to the base member and a distal edge. The protrusions in each transverse row are oriented substantially identically to the other protrusions in the same transverse row. The protrusions in each row are oriented such that the bottom edge portion of the protrusions are at an angle from about 45° to 135° with respect to the bottom edge portions of the protrusions in each adjacent row.

Each protrusion may have a triangular shaped body in which one side of the body forms the bottom edge portion of the protrusion and the corner of the body opposite to the bottom edge portion forms the distal edge of the protrusion. The base member may have at least one side wall configured to be releasably fastened to engagement structure formed on a power sander. The abrasive plate is preferably monolithically formed from thin stock carbon steel.

The present invention also relates to a method of producing an abrasive plate including the steps of: providing a base member; forming a plurality of rows of protrusions in the base member wherein the protrusions in each respective row have a common orientation and wherein protrusions in each row are oriented such that a bottom edge portion of the protrusions are at an angle from about 45° to 135° with respect to the bottom edge portions of the protrusions in each adjacent row. The method may further include the step of forming at least one side wall substantially perpendicular to the base member adapted to be releasably fastened to engagement structure on a power sander. Preferably, the step of forming the at least one side wall includes rolling an edge portion of the base member to form the side wall.

The present invention provides increased service life over sandpaper and similar materials and may be adapted to be used with conventional power sanders without being affected by the drawbacks associated with known abrasive plates. In addition, the abrasive plate can advantageously be manufactured in volume in an efficient manner.

BRIEF DESCRIPTION OF THE DRAWINGS

Preferred embodiments of the invention are described hereinbelow with reference to the drawings wherein:

FIG. 1B is a schematic top view of an alternate embodiment of the abrasive plate of the present invention;

FIG. 1C is a schematic front elevational view of the abrasive plate shown in FIG. 1B;

DESCRIPTION OF THE PREFERRED EMBODIMENTS

Figure 1A:
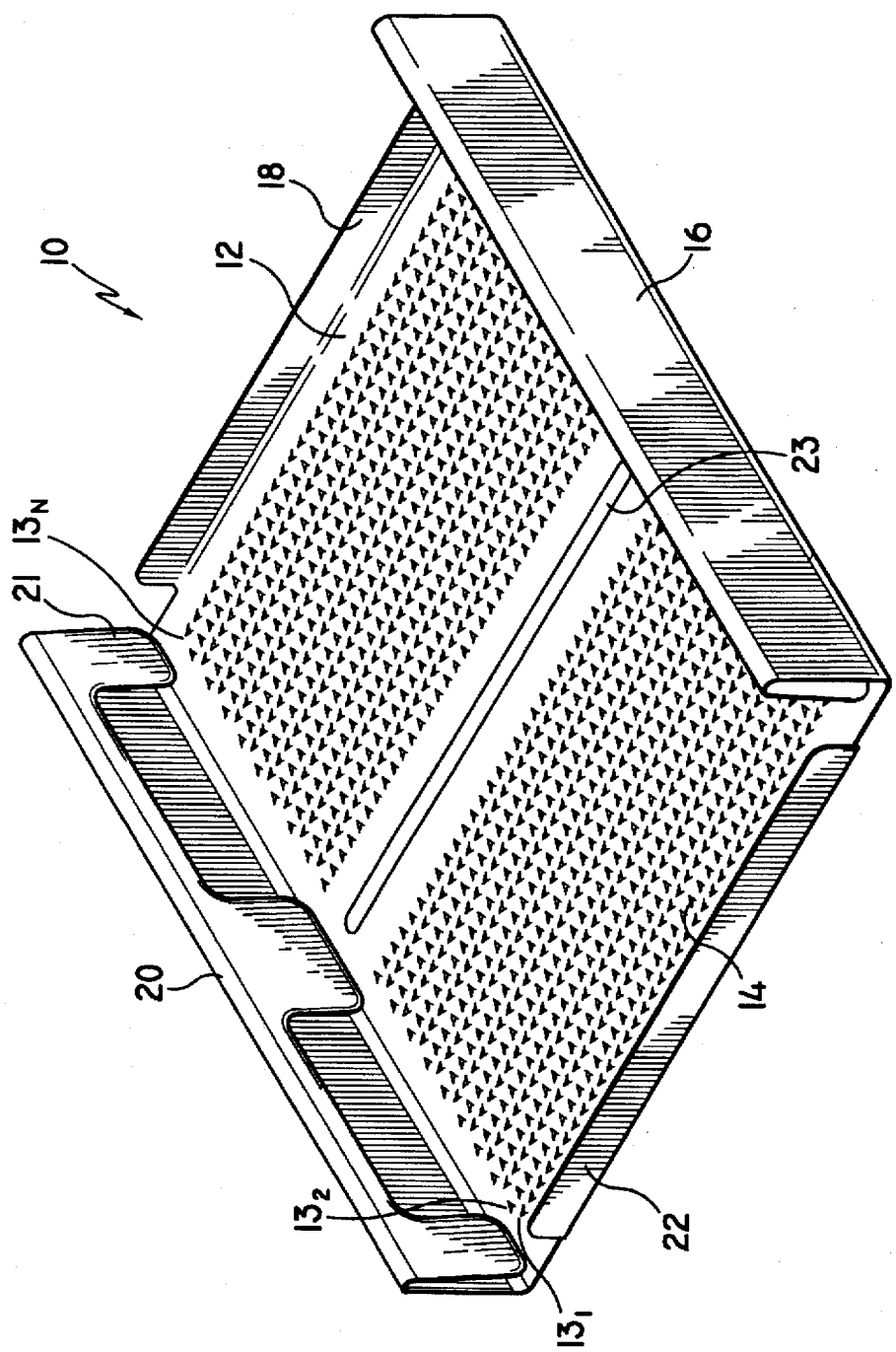
FIG. 1A is a schematic perspective view of an abrasive plate made in accordance with the present invention.

Preferred embodiments of the presently disclosed abrasive plate will now be described in detail with reference to the drawings, in which like reference numerals designate identical or corresponding elements in each of the several views.

Referring to FIGS. 1A–1C, an abrasive plate shown generally as 10 includes a base member 12 having multiple rows 13$_1$–13$_N$ of protrusions 14 (where N refers to the highest number row of a plurality of consecutively numbered rows). Protrusions 14 extend outwardly from the abrasive plate 10 to collectively form an abrasive surface on base member 12. Preferably, the abrasive plate 10 is constructed from thin stock carbon steel and has a rectangular shape, although other materials having the requisite strength requirements may be used to construct the plate and the plate 10 may take any desired shape.

Abrasive plate 10 is formed with side walls 16, 18, 20 and 22. The sidewalls are configured to be releasably fastened to engagement structure of a power sander or other device commonly used for holding sandpaper and the like (not shown). Side walls 16 and 20, for example, may include resilient fingers 21 which engage recesses or other structure disposed on a power sander to secure the plate 10 to the sander. The resilient fingers 21 may be formed by double folding a portion of sidewalls 16 and 20 (FIG. 1A) or by providing tabs in sidewalls 16 and 20 (FIGS. 1B and 1C). The resilient fingers 21 facilitate quick and easy removal and attachment of abrasive plate 10 from a power sander.

The abrasive plate 10 may be monolithically formed from a sheet of material, e.g., thin stock carbon steel. Preferably, sidewalls 16, 18, 20 and 22 are formed by folding the edges of the base member 12 to a position substantially perpendicular to the base member. In particularly useful embodiments, the abrasive plate 10 may be about 0.020 inches thick. The plate can be dimensioned to be adaptable to ¼, ⅓ or ½ sheet power sanders currently available in the market. The abrasive plate 10 may also include one or more stiffening ribs 23 formed on the surface of the base member 12 to reinforce the plate and prevent flexing of base member 12. Although only one rib 23 is shown, a plurality of ribs at various orientations or positions may be provided.

Figure 2:
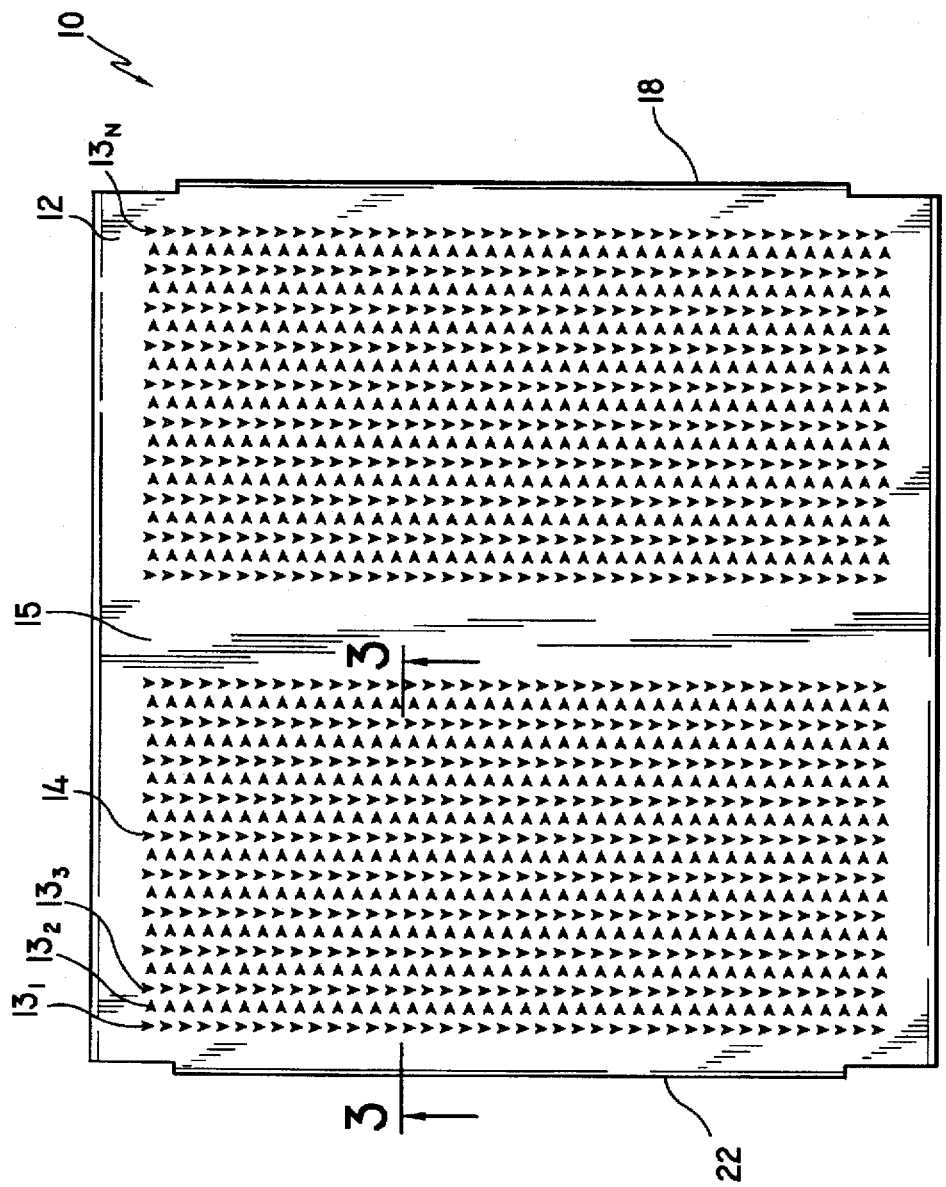
FIG. 2 is a schematic bottom view of the abrasive plate of FIG. 1A.

Referring now to FIG. 2, a plurality of rows $13_1$–$13_N$ of protrusions 14 are formed in the base plate 10. The protrusions 14 are formed such that each protrusion 14 in a row $13_i$ (where i refers to an exemplary row of the plurality of rows) of protrusions 14 has substantially the same orientation as other protrusions 14 in that row. The protrusions 14 in adjacent rows are oriented such that a bottom edge portion of the protrusions are at a predetermined angle from about 45° to about 135° with respect to the bottom edge portions of the protrusions in row $13_i$. By varying the orientation of the protrusions 14 in adjacent rows in the manner described above, the forces transmitted through the abrasive plate 10 during operation of a power sander may be substantially balanced to eliminate or substantially reduce pulling of the power sander in any one direction during a sanding operation.

Figure 3:
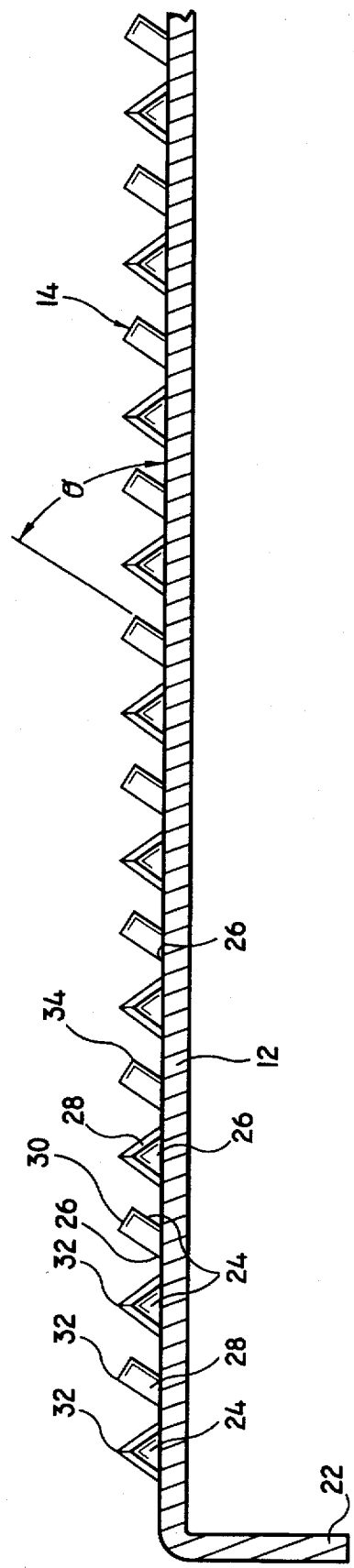
FIG. 3 is a schematic side cross-sectional view of the abrasive plate taken along section line 3 of FIG. 2.

In an illustrative embodiment of the present invention shown in FIG. 3, each of the protrusions 14 is triangularly-shaped and includes a planar face 24, a bottom edge portion 26 attached to the base member 12, a side wall 28, and a distal edge 30. The protrusion 14 is formed such that the planar face 24 and the base member 12 define an angle Θ of about 60° to about 120° (see also FIG. 4). The protrusions 14 may be formed having a height of from about 0.005 to about 0.1 inches. The specific dimensions of the abrasive plate 10 and of the protrusions 14 will vary according to the intended use of the plate 10.

Figure 4:
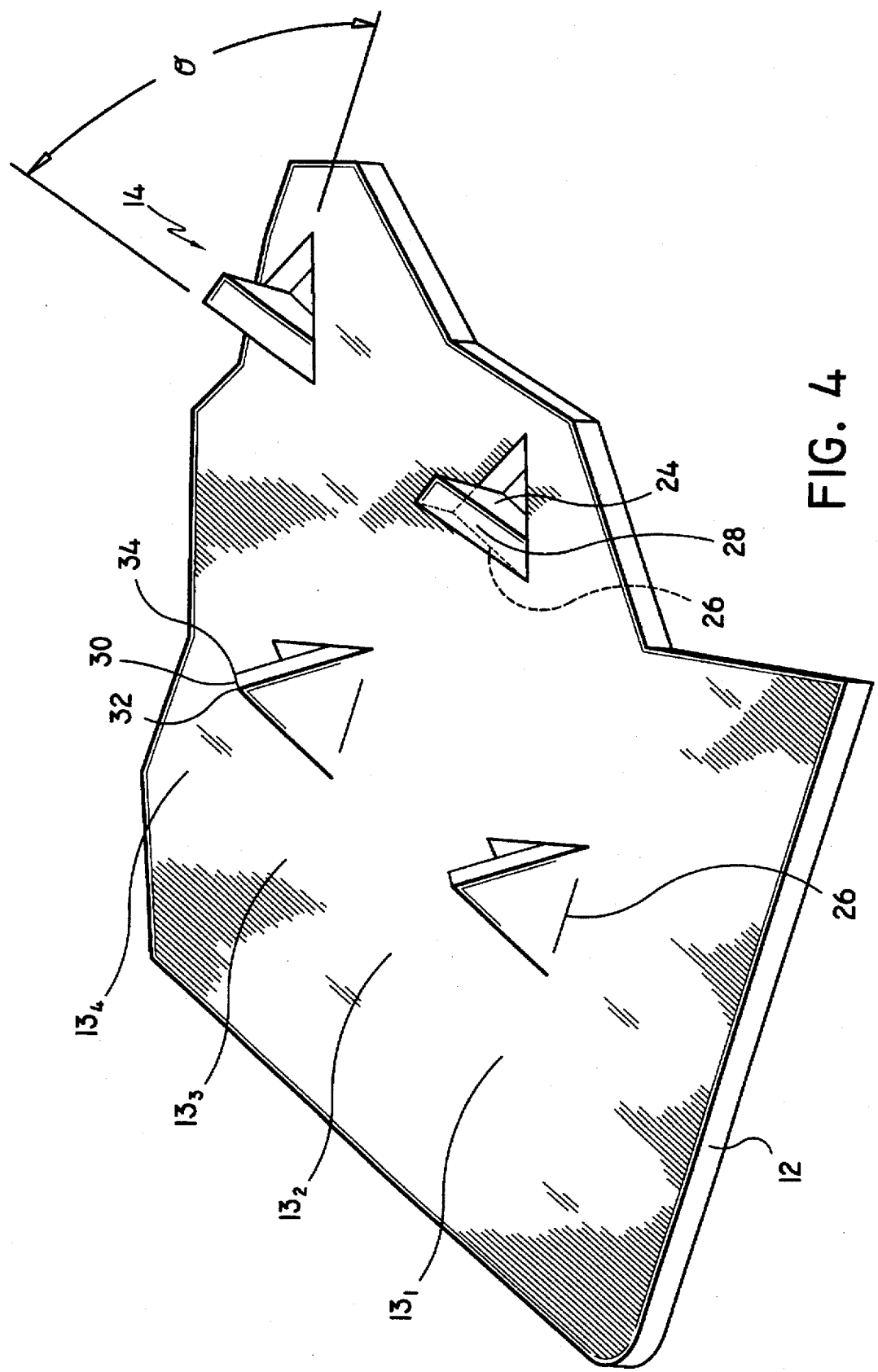
FIG. 4 is a schematic perspective view showing details of the protrusions of the abrasive plate of FIGS. 1A–1C.

Referring now to FIG. 4, in a preferred embodiment of the disclosure, the bottom edge portions 26 of protrusions 14 in each row are oriented at an angle of approximately 90° with respect to the bottom edge portions 26 of the protrusions 14 in adjacent rows. The bottom edge portions 26 of the protrusions 14 in alternate rows (i.e., row $13_i$ and row $13_{i+1}$ may be rotated 180° and still provide a balanced power sanding device.

Preferably, the protrusions 14 are formed in a single sheet of material using a mechanical punch having a desired shape to form the rows $13_1$–$13_N$ of protrusions 14. As stated above, each protrusion 14 in a row of protrusions is formed having a substantially identical orientation to the other protrusions 14 in that row. The bottom edge portions 26 of the protrusions 14 in each row are oriented at an angle of about 45° to about 135° with respect to the bottom edge portions 26 of the protrusions in adjacent rows. The edges of the abrasive plate are mechanically shaped via rolling and cutting into a configuration adapted to be fastened to engagement structure formed on a power sanding device.

In use, the abrasive plate 10 is fastened to a power sanding device by fastening the sidewalls 16, 18, 20 and 22 to engagement structure on the power sanding device such that the abrasive surface of the abrasive plate 10 faces away from the sanding device. The abrasive surface is pressed against the surface to be treated and the power sanding device is actuated to cause the abrasive surface to move relative to the surface being treated. If the angle Θ defined by the planar surface 24 of the protrusions 14 and base member 12 is 90°, the entire distal edge 30 of the protrusion will engage the surface being treated. For all other angles, the leading point 32 or the trailing point 34 of the protrusions 14 will first engage the surface being treated.

It will be understood that various modifications may be made to the embodiments disclosed herein. For example, the abrasive plate 10 may be adapted to be fitted onto a manual sanding block. As another example, the abrasive plate 10 may be constructed in belt form having a thickness of from about 0.005 to 0.060 inch such that it may be fitted on a belt sander. Therefore, the above description should not be construed as limiting, but merely as exemplifications of preferred embodiments. Those skilled in the art will envision other modifications within the scope and spirit of the claims appended hereto.

What is claimed is:

1. An abrasive plate comprising:
 a base member having at least three rows of protrusions forming an abrasive surface, each protrusion including a body having a bottom edge portion attached to the base member and a distal edge portion; and
 the protrusions in each row having substantially the same orientation as the other protrusions in that row, and the bottom edge portions of the protrusions in each row being oriented at an angle of about 45° to about 135° with respect to the bottom edge portions of the protrusions in at least one adjacent row.

2. An abrasive plate according to claim 1, wherein the body of each protrusion includes a planar face, the planar face defining an angle of about 60° to about 120° with respect to the base member.

3. An abrasive plate according to claim 1, wherein the plate is constructed from metal.

4. An abrasive plate according to claim 1, wherein the base member further comprises at least one side wall configured to engage engagement structure on a power sanding device.

5. An abrasive plate according to claim 3, wherein the abrasive plate is monolithically formed.

6. An abrasive plate according to claim 1, wherein the body of each protrusion is triangularly-shaped.

7. An abrasive plate according to claim 6, wherein the body of each protrusion includes a planar face, the planar face defining an angle of about 60° to about 120° with respect to the base member.

8. An abrasive plate comprising:

a base member;

at least three rows of protrusions formed on the base member, each protrusion having a bottom edge portion attached to the base member and a distal edge;

the bottom edge portions of the protrusions in each row of at least three rows having a common orientation with other protrusions in the same row, and the bottom edge portions of the protrusions in each row being at a predetermined angle to the bottom edge portions of the protrusions in each adjacent row, the predetermined angle being from about 45° to about 135°; and at least one side wall extending from the base member configured to engage engagement structure formed on a power sander device.

9. An abrasive plate according to claim 8, wherein each protrusion has a triangular shape.

10. An abrasive plate according to claim 8, wherein each protrusion has a planar face, the planar face defining an angle of about 60° to 120° with respect to the base member.

11. An abrasive plate according to claim 8, wherein the base member is made out of thin stock carbon steel.

* * * * *